(12) United States Patent
Mahabadi et al.

(10) Patent No.: US 9,296,622 B2
(45) Date of Patent: Mar. 29, 2016

(54) METHOD FOR CONTINUOUS PREPARATION OF INDIUM-TIN COPRECIPITATES AND INDIUM-TIN-OXIDE NANOPOWDERS WITH SUBSTANTIALLY HOMOGENEOUS INDIUM/TIN COMPOSITION, CONTROLLABLE SHAPE AND PARTICLE SIZE

(71) Applicant: HY-POWER NANO INC., Brampton (CA)

(72) Inventors: Hadi K Mahabadi, Mississauga (CA); Juan-Pablo Bravo-Vasquez, Edmonton (CA); Sinoj Abraham, Edmonton (CA); Guibun Ma, Edmonton (CA); Nathan Gerein, Saint Albert (CA)

(73) Assignee: HY-POWER COATINGS LIMITED, Brampton (CA)

( * ) Notice: Subject to any disclaimer, the term of this patent is extended or adjusted under 35 U.S.C. 154(b) by 140 days.

(21) Appl. No.: 13/671,150

(22) Filed: Nov. 7, 2012

(65) Prior Publication Data

US 2014/0054521 A1 Feb. 27, 2014

(30) Foreign Application Priority Data

Aug. 22, 2012 (CA) ..................................... 2787584

(51) Int. Cl.
*F21V 9/04* (2006.01)
*F21V 9/06* (2006.01)
(Continued)

(52) U.S. Cl.
CPC ................. *C01G 19/02* (2013.01); *B82Y 20/00* (2013.01); *B82Y 30/00* (2013.01); *C01G 19/00* (2013.01);
(Continued)

(58) Field of Classification Search
USPC ................. 106/286.4; 252/518.1, 520.1, 587; 423/594.9, 618; 427/62, 163.1, 165, 427/168, 162
See application file for complete search history.

(56) References Cited

U.S. PATENT DOCUMENTS

| 5,401,441 A | 3/1995 | Robert et al. |
| 5,518,810 A | 5/1996 | Nishihara et al. |

(Continued)

FOREIGN PATENT DOCUMENTS

| CN | 1583878 A | 2/2005 |
| CN | 1667004 A | 9/2005 |

(Continued)

OTHER PUBLICATIONS

Zhanlai Ding, Cunran An, Qiang Li, Zhezhe Hou, JianqiangWang, Haibo Qi, and Fangjuan Qi, Preparation of ITO Nanoparticles by Liquid Phase Coprecipitation Method, Journal of Nanomaterials, vol. 2010, Article ID 543601, 5 pages, Hindawi Publishing Corporation.*

(Continued)

*Primary Examiner* — Bijan Ahvazi
(74) *Attorney, Agent, or Firm* — Standley Law Group LLP

(57) ABSTRACT

Disclosed herein are indium-tin-oxide nanoparticles and a method for continuously producing precipitated indium-tin nanoparticles having a particle size range of substantially from about 10 nm to about 200 nm and a substantially consistent ratio of indium to tin in the resultant nanoparticles across the duration of the continuous process, based on the ratio of indium to tin in a seeding solution. The method comprises preparing intermediate indium and tin compounds of the general formula $[M(OH)_xC_y]$, where M represents the indium or tin ionic component of indium or tin salts, C represents the cationic component of indium or tin salt(s), x is a number greater than 0 and $y=[M*valance-x]/C*$ valance in the seeding solution. The intermediate compounds are continuously precipitated with a base solution in a reaction vessel initially having a solvent contained therein. The method also provides a means for controlling the shape of the resultant nanoparticles. The resultant indium-tin nanoparticles may be further processed into dispersions.

23 Claims, 6 Drawing Sheets

(51) Int. Cl.
  *G02B 5/22* (2006.01)
  *G02B 5/26* (2006.01)
  *C01G 19/02* (2006.01)
  *G02B 1/00* (2006.01)
  *H01B 1/08* (2006.01)
  *C01G 19/00* (2006.01)
  *G02B 5/20* (2006.01)
  *B82Y 20/00* (2011.01)
  *B82Y 30/00* (2011.01)
  *C03C 17/00* (2006.01)
  *C01G 17/02* (2006.01)
  *C01G 21/02* (2006.01)

(52) U.S. Cl.
  CPC .............. *C03C 17/007* (2013.01); *G02B 1/002* (2013.01); *G02B 5/206* (2013.01); *G02B 5/208* (2013.01); *H01B 1/08* (2013.01); *C01P 2002/72* (2013.01); *C01P 2002/76* (2013.01); *C01P 2004/03* (2013.01); *C01P 2004/20* (2013.01); *C01P 2004/32* (2013.01); *C01P 2004/51* (2013.01); *C01P 2004/62* (2013.01); *C01P 2004/64* (2013.01); *C01P 2006/80* (2013.01); *C03C 2217/231* (2013.01); *C03C 2218/114* (2013.01); *G02B 2207/101* (2013.01)

(56) References Cited

U.S. PATENT DOCUMENTS

| | | | |
|---|---|---|---|
| 6,037,012 A | 3/2000 | Lourman | |
| 6,533,966 B1 | 3/2003 | Nonninger et al. | |
| 6,645,772 B1 | 11/2003 | Kirby et al. | |
| 6,649,672 B1 | 11/2003 | Dücoffre et al. | |
| 7,179,422 B2 | 2/2007 | Kirby et al. | |
| 7,323,121 B2 | 1/2008 | Burgard et al. | |
| 7,364,673 B2 | 4/2008 | Arsenault et al. | |
| 7,374,743 B2 | 5/2008 | Katusic et al. | |
| 7,449,235 B2 | 11/2008 | Sawaki et al. | |
| 7,588,828 B2 | 9/2009 | Mushtaq et al. | |
| 7,601,661 B2 | 10/2009 | Takahashi et al. | |
| 7,616,376 B2 | 11/2009 | Arsenault et al. | |
| 7,666,494 B2 | 2/2010 | McClure et al. | |
| 7,727,633 B2 | 6/2010 | Kirkman et al. | |
| 7,736,532 B2 | 6/2010 | Silverman et al. | |
| 7,749,577 B2 | 7/2010 | Goldfinger et al. | |
| 7,759,414 B2 | 7/2010 | Hayes et al. | |
| 7,781,055 B2 | 8/2010 | Chung et al. | |
| 7,935,540 B2 | 5/2011 | Kalgutkar et al. | |
| 7,994,089 B2 | 8/2011 | Strasser et al. | |
| 8,062,701 B2 | 11/2011 | McClure et al. | |
| 8,101,061 B2 | 1/2012 | Suh et al. | |
| 8,115,232 B2 | 2/2012 | Sargent et al. | |
| 8,119,233 B2 | 2/2012 | Chiruvolu et al. | |
| 8,142,896 B2 | 3/2012 | Biteau et al. | |
| 8,158,542 B2 | 4/2012 | Werdecker et al. | |
| 8,209,998 B2 | 7/2012 | Werdecker et al. | |
| 8,221,657 B2 | 7/2012 | Peri et al. | |
| 8,333,831 B2 | 12/2012 | van de Belt et al. | |
| 8,357,728 B2 | 1/2013 | Butler et al. | |
| 8,450,138 B2 | 5/2013 | Sargent et al. | |
| 8,497,422 B2 | 7/2013 | Thony | |
| 8,506,694 B2 | 8/2013 | Odell et al. | |
| 8,568,824 B2 | 10/2013 | Wu et al. | |
| 8,574,665 B2 | 11/2013 | Wu et al. | |
| 8,834,686 B2 | 9/2014 | McClure et al. | |
| 2006/0074172 A1 | 4/2006 | Yang et al. | |
| 2006/0159921 A1 | 7/2006 | Murthy et al. | |
| 2006/0197953 A1 | 9/2006 | Perez et al. | |
| 2006/0275627 A1 | 12/2006 | Biteau et al. | |
| 2006/0292404 A1 | 12/2006 | Harris | |
| 2007/0048529 A1 | 3/2007 | Hsu | |
| 2007/0141114 A1 | 6/2007 | Muisener et al. | |
| 2007/0154718 A1 | 7/2007 | Silverman et al. | |
| 2007/0181856 A1 | 8/2007 | Park et al. | |
| 2008/0034921 A1 | 2/2008 | Vanheusden et al. | |
| 2008/0047466 A1* | 2/2008 | Tanoue et al. ............ 106/286.4 |
| 2008/0075936 A1 | 3/2008 | McGurran et al. | |
| 2008/0075947 A1 | 3/2008 | Padiyath et al. | |
| 2008/0160321 A1 | 7/2008 | Padiyath et al. | |
| 2008/0176076 A1 | 7/2008 | van Veggel et al. | |
| 2008/0230120 A1 | 9/2008 | Reddy | |
| 2008/0291541 A1 | 11/2008 | Padiyath et al. | |
| 2008/0292820 A1 | 11/2008 | Padiyath et al. | |
| 2008/0304008 A1 | 12/2008 | Muisener et al. | |
| 2009/0099282 A1 | 4/2009 | Muller et al. | |
| 2009/0114618 A1 | 5/2009 | Zhang et al. | |
| 2009/0161061 A1 | 6/2009 | Qi et al. | |
| 2009/0169870 A1 | 7/2009 | Zheng | |
| 2009/0209420 A1 | 8/2009 | Kalgutkar et al. | |
| 2009/0233090 A1 | 9/2009 | Wong et al. | |
| 2009/0291295 A1 | 11/2009 | Chung et al. | |
| 2010/0079721 A1 | 4/2010 | Qi et al. | |
| 2010/0085684 A1 | 4/2010 | Suh et al. | |
| 2010/0194263 A1 | 8/2010 | Winkler et al. | |
| 2010/0201250 A1 | 8/2010 | Winkler et al. | |
| 2010/0240772 A1 | 9/2010 | Koplin et al. | |
| 2010/0263790 A1 | 10/2010 | Goldfinger et al. | |
| 2011/0036269 A1 | 2/2011 | Hill et al. | |
| 2011/0150938 A1 | 6/2011 | Cao et al. | |
| 2011/0164317 A1 | 7/2011 | Vergohl et al. | |
| 2011/0189702 A1 | 8/2011 | Sun | |
| 2011/0248223 A1 | 10/2011 | Zheng | |
| 2012/0015179 A1 | 1/2012 | Zheng | |
| 2013/0095290 A1 | 4/2013 | Muisener et al. | |
| 2013/0244366 A1 | 9/2013 | Sargent et al. | |

FOREIGN PATENT DOCUMENTS

| | | |
|---|---|---|
| CN | 101220128 A | 7/2008 |
| CN | 101704547 B | 4/2011 |
| CN | 102642863 B | 3/2014 |
| EP | 2281646 A1 | 2/2011 |
| GB | 2451864 A | 2/2009 |
| JP | 2008056873 A | 3/2008 |
| KR | 10-2006-0009500 A | 2/2006 |
| KR | 10-2009-0027315 A | 3/2009 |
| TW | 200623489 A | 7/2006 |
| WO | 97/24224 A1 | 7/1997 |
| WO | 02/090459 A1 | 11/2002 |
| WO | 2006/054888 A2 | 5/2006 |
| WO | 2008/141972 A1 | 11/2008 |
| WO | 2009/002644 A2 | 12/2008 |

OTHER PUBLICATIONS

International Search Report, PCT/CA2013/000721, Dec. 20, 2013, 6 pages, Gatineau, Quebec, Canada.

* cited by examiner

METHOD FOR CONTINUOUS PREPARATION OF INDIUM-TIN COPRECIPITATES AND INDIUM-TIN-OXIDE NANOPOWDERS WITH SUBSTANTIALLY HOMOGENEOUS INDIUM/TIN COMPOSITION, CONTROLLABLE SHAPE AND PARTICLE SIZE

RELATED APPLICATION

This application is related to and claims benefit of priority to Canadian Patent Application Serial Number 2,787,584 entitled "METHOD FOR CONTINUOUS PREPARATION OF INDIUM-TIN COPRECIPITATES AND INDIUM-TIN-OXIDE NANOPOWDERS WITH SUBSTANTIALLY HOMOGENEOUS INDIUM/TIN COMPOSITION, CONTROLLABLE SHAPE AND PARTICLE SIZE," filed Aug. 22, 2012, the disclosure of which is herein fully incorporated by reference.

FIELD

The present disclosure relates to nano-scale indium-tin-oxide particles and powders comprised of the particles having a substantially consistent indium-to-tin ratio. More particularly, the nano-scale indium-tin-oxide particles are made under substantially constant reaction conditions throughout precipitation by a continuous process so as to obtain a desired shape and/or size range of the particles having the substantially consistent indium-to-tin ratio.

BACKGROUND

Indium-tin-oxide particles are known for their unique electrical and optical properties, which depend on level of tin doping. For example, tin-doped indium oxide (indium-tin-oxide, ITO) thin films with optimum tin doping have high light transparency within the visible light spectrum and low electrical resistivity. Such ITO films have been used as electrodes in the manufacturing of solar cells, flat panel displays, heat shields and gas sensors. The doping level of tin in indium is a factor that is related to the optical and electrical properties of indium-tin-oxides. Conventional physical deposition techniques for the production of ITO films are DC sputtering, RF sputtering, or electron beam evaporation. Sputtering, for example, involves forming a film by sputtering at a sputter target and is used in many industrial applications especially glass coating and microelectronics.

Indium-tin-oxides are generally formed by mixing the respective oxides in a predetermined ratio, molding the mixture under dry or wet conditions and sintering the mold at the require temperature. Afterwards, the indium-tin-oxide is sputtered onto glass substrates by controlled electron beam heating. Such techniques require costly high vacuum equipment, and the utilization rate of the ITO material is low, as the materials are not selectively deposited on the substrate.

Metal oxide nanoparticles, synthesized from aqueous solutions for use in thin films of ITO deposited at low temperatures, are important for the preparation of transparent conductive films with high yield. Dip-coating or spray deposition of transparent ITO films with low resistivity, and low-membrane resistant ITO films are known processes which require nanomaterials of enhanced quality in terms of the size, level of tin doping and morphology of the nanoparticles.

With the development of nanometer material research, several methods for the production of nano-sized ITO particles have emerged. Known methods for nanoscale indium-tin-oxide preparation mainly include solid-phase methods. U.S. Pat. No. 7,601,661 purports to describe a solid phase process for producing an ITO powder at low cost and which provides high density sputtering targets having a longer lifetime. The approach involves creating a solid solution of indium and tin precursors, which can be a sputtered at a target. This approach, however, does not appear produce ITO nanoparticles or nanometer size ITO thin films that can be used directly. This approach appears only to enable formation of particles by evaporating the solid solution using magnetron sputtering. Furthermore, the ITO produced by this method may be of a low yield, yellow in colour and require further processing so as to dope the nanomaterial film.

Known liquid-phase methods of ITO production include liquid phase precipitation, hydrothermal (high temperature hydrolysis), Sol-gel (colloidal chemistry), and radiation chemical synthesis.

U.S. Pat. No. 5,401,441 purports to describe a method for the preparation of conductive metal oxide powders by forming a colloidal aqueous solution of crystalline particles of composite oxides of several metals by hydrolyzing a starting solution of metal ions and an agent for complexing the metals. An acid or base is added to the starting solution, and then heat-treated. The disclosed hydrolyzing process includes a process of adding acid or base to the starting aqueous solution causing a change of pH and formation of crystalline particles. As the pH changes, the concentration of reactants reduces and the composition of reactants shifts resulting in production of composite oxides having various ratios of the metals from one particle to another as they are produced throughout the reaction. The resulting final product may thus be a mixture of metal oxides having different compositions.

U.S. Pat. No. 6,533,966 purports to describe a co-precipitation ITO powder production method that involves, as described in the examples, the drop-wise addition of a base, such as hydroxylammonium, to a mixture of indium and tin compounds such as indium and tin chloride. During the addition of the base, such as for example hydroxylammonium, the pH of the reactant mixture changes from the ranges of 0 to 1 to the range of 3.5 to 4.5, depending on the exact reaction conditions, and then to 10 as an increasing ratio of indium to tin particles are formed. In addition, the reaction mixture, according to this method, is a mixture of unreacted indium and tin ions and precipitated materials. The concentration of unreacted ions reduces from 100% at the outset of the reaction to very low at the completion of the precipitation reaction. As such, the reacting ion concentration changes throughout the reaction. Thus, it is believed that the resultant indium-tin-oxide particles have various ratios of indium to tin and are not in substantially the same ratio as that found among the reactants at the outset of the reaction. In other words, it is believed that the reaction conditions are prone to drift through the course of the reaction and may result in particles with various ratios of indium to tin. This effect of reaction condition drifting is not disclosed. Furthermore, this method does not teach a substantially continuous process for the production of indium-tin-oxide under substantially constant reaction conditions where the reaction conditions may be adjusted so as to obtain a desired size range of ITO particles having a desired particle shape and a substantially consistent ratio of indium to tin in the formed particles of the resulting powder. Co-precipitation processes similar to those described in the above-mentioned U.S. Pat. No. 6,533,966 are known where the co-precipitation is carried out under evolving pH conditions, by adding a high pH base to a very low pH mixture of indium and tin compounds. The pH changes during the precipitation would, it is believed, lead to products having particles with wide range of indium-to-tin ratios, and therefore to products having inconsistent electrical and optical properties, owing to operational efficiencies.

U.S. patent application publication serial number U.S. 2011/0036269 purports to describe a process for producing an ITO by adding a base, such as hydroxyl ammonium, to a mixture of indium and tin compounds. As a result, the pH of the reaction also changes gradually from a range of about 0 to 1 to a range of about 3.5 to 4.5 and then to 10 during reaction. This change of pH results in nanoparticle powders of indium and tin having different ratios of indium to tin since the indium and tin have different solubility constants at different pH levels. Furthermore, as the base, such as hydroxylammonium, is added to a vessel containing the mixture of indium and tin compounds in this production process, the ratio of indium to tin changes over time, owing to the gradual change in pH of the reaction. Therefore the ratio of indium to tin is not the same at various time points from the commencement of the precipitation reaction to the end, which may lead to an inconsistent ratio of indium to tin in the final the product.

SUMMARY OF THE GENERAL INVENTIVE CONCEPT

The following presents a simplified summary of various embodiments of the general inventive concept. This summary is not intended to restrict key or critical elements of the invention or to delineate the scope of the invention beyond that which is explicitly or implicitly described by the following description and claims.

Conventional processes are believed to be limited in that particle size range and shape of the produced ITO particles cannot be controlled, nor the ratios of reacting indium to tin in the reaction vessel, and thus in the final product. The reaction conditions, such as pH and reactant concentrations change in the conventional processes and as a result, the composition of precipitated particles at different time points during production changes, resulting in an ITO with mixture of tin doping levels. Therefore, it would desirable to develop a continuous preparation process for producing ITO nanoparticles and powders having a substantially consistent and desired ratio of tin to indium and where a desired particle size range and particle shape can be reliably obtained. Such a process may, for example, include substantially constant and controllable reaction conditions such as pH, temperature and composition of reactants throughout the reaction time, wherein such a process allows for the production of nanoparticles having a substantially homogeneous indium-to-tin oxide ratio, which may be required for consistent electrical and optical properties.

Disclosed herein, in an exemplary embodiment, is a continuous process for making nano-scale indium-tin-oxide particles under reaction conditions where the pH, temperature and reactant concentrations (indium and tin) are controlled throughout the reaction so as to allow the preparation of nanoscale ITO particles having a substantially homogenous indium-to-tin composition or ratio which is based on the initial reactant concentrations. Furthermore, such a continuous process may also allow for control of the shape and size range of the produced nanoparticles. Furthermore, the process may allow for the preparation of nano-scale particles of indium doped tin oxide powders with consistent optical and/or electronic properties for use in, for example, coatings and other applications.

In some exemplary embodiments there is provided herein a continuous process in which various reaction parameters, such as, for example, pH and temperature, are kept substantially constant at the required levels as well as the composition and relative amounts of the reacting indium and tin compounds throughout the precipitation time so as to provide resulting nano-scale precipitated particles of an indium-tin compound with a substantially homogenous and desired indium-to-tin ratio, based on the initial relative reactant concentrations. The precipitated indium-tin compound, having the substantially homogenous composition, may be useful for producing indium-tin-oxide nanoparticles having a desired particle size distribution, desired shape and ratio of indium to tin, so as to allow for substantially consistent and reliable electrical and optical properties. Thus, a preparation method for nano-scale particles of indium-tin-oxide, wherein a desired shape, particle size range and ratio of indium to tin is desired for different applications, may be provided.

In some exemplary embodiments, there is provided a method for preparing an indium-tin-oxide nanopowder having a desired and substantially consistent indium-to-tin ratio, desired particle size range and desired particle shape. The method comprises:

a) preparing a seeding solution including at least one indium salt, at least one tin salt, at least one solubility modifier and at least one base in a required amount of a solvent such as, for example, water so as to form intermediate indium compounds and tin compounds having a general formula expressed as $[M(OH)_xC_y]$, where M is an indium or tin ion, and C is the cationic part of the at least one indium or the least one tin salt, x is number greater than 0 and y=[M valence−x]/C valence;

b) adjusting the pH of the seeding solution and the concentration of the solubility modifier, so as to solubilize the indium and tin intermediate compounds to near the onset of precipitation, wherein the pH of the seeding solution is from about 0 to about 3;

c) continuously introducing into a reaction vessel the seeding solution having the indium and tin intermediate compounds therein;

d) continuously introducing into the reaction vessel a base solution comprising one or more bases;

e) continuously mixing the seeding solution and the base solution such that the indium and tin intermediate compounds react with the base solution so as to form a mixture of crystalline and amorphous precipitated indium-tin nanoparticles and reaction by-product salts in a solvent such as, for example, water wherein the rate of the introduction of the seeding solution and the base solution are independently adjustable so as to maintain the pH of the mixture at a substantially constant pH of greater than about 3 and a substantially constant ratio of indium intermediate compounds to tin intermediate compounds in the mixture;

f) continuously collecting, in a collecting tank, an overflow portion of the mixture having therein indium-tin precipitated nanoparticles;

g) removing a portion of the mixture from the collecting tank and washing and drying the indium-tin precipitated nanoparticles; and h) heating the washed and dried indium-tin precipitated nanoparticles so as to obtain the indium-tin-oxide nanopowder.

In some exemplary embodiments, there is provided a method for preparing an indium-tin-oxide nanopowder having a desired and substantially consistent indium-to-tin ratio, desired particle size range and desired particle shape. The method comprises:

a) preparing a seeding solution including at least one indium salt, at least one tin salt, at least one solubility modifier and at least one base in a required amount of a solvent so as to form intermediate indium compounds and tin compounds having a general formula expressed as [M(OH)$_x$C$_y$], where M is an indium or tin ion, and C is the cationic part of the at least one indium or the least one tin salt, x is a number greater than 0 and y=[M valence−x]/C valence;

b) adjusting the pH of the seeding solution and the concentration of the solubility modifier so as to solubilize the indium and tin intermediate compounds to near the onset of precipitation wherein the pH of the seeding solution is from about 0 to about 3;

c) continuously introducing into a reaction vessel the seeding solution having the indium and tin intermediate compounds therein;

d) continuously introducing into the reaction vessel a base solution comprising one or more bases;

e) continuously mixing the seeding solution and the base solution such that the indium and tin intermediate compounds react with the base solution to form a mixture including crystalline and amorphous precipitated indium-tin nanoparticles, the rate of the introduction of the seeding solution and the base solution each being independently adjustable so as to maintain the pH of the mixture at a substantially constant pH of greater than about 3 and a substantially constant ratio of indium intermediate compounds to tin intermediate compounds in the mixture;

f) continuously collecting and removing a portion of the mixture having therein indium-tin precipitated nanoparticles;

g) washing and drying the removed indium-tin precipitated nanoparticles; and h) heating the washed and dried indium-tin precipitated nanoparticles so as to obtain the indium-tin-oxide nanopowder In some exemplary embodiments, there is provided a continuously produced indium-tin-oxide nanoparticle preparation in which at least 90% of the indium-tin-oxide nanoparticles have a common indium-to-tin ratio. In further exemplary embodiments, the continuously produced indium-tin-oxide nanoparticle preparation may be characterized in that at least 95% of the indium-tin-oxide nanoparticles have a common indium-to-tin ratio. In yet further exemplary embodiments, the continuously produced indium-tin-oxide nanoparticle preparation may be characterized in that at least 99% of the indium-tin-oxide nanoparticles have a common indium-to-tin ratio.

In some exemplary embodiments, there is provided a continuously produced indium-tin-oxide nanoparticle preparation characterized in that at least 90% of the indium-tin-oxide nanoparticles have a common indium-to-tin ratio within a deviation of about 10 percent.

In some exemplary embodiments, there is provided an indium-tin-oxide nanoparticle preparation characterized in that at least 90% of the indium-tin-oxide nanoparticles have a common indium-to-tin ratio. In further exemplary embodiments, the indium-tin-oxide nanoparticle preparation may be characterized in that at least 95% of the indium-tin-oxide nanoparticles have a common indium-to-tin ratio. In yet further exemplary embodiments, the indium-tin-oxide nanoparticle preparation may be characterized in that at least 99% of the indium-tin-oxide nanoparticles have a common indium-to-tin ratio.

In some exemplary embodiments, there is provided an indium-tin-oxide nanoparticle preparation, which when entrained in a given polymer coating material, blocks at least 50% of near infrared light at wavelengths of 1100 nm or greater. In still further exemplary embodiments, there is provided an indium-tin-oxide nanoparticle preparation, which when entrained at a concentration of about 6%, on a weight/weight basis, in a given polymer coating material and applied to a glass substrate at a thickness of about 6 microns, blocks at least 50% of near infrared light at wavelengths of 1100 nm or greater.

In some exemplary embodiments, there is provided an indium-tin-oxide nanoparticle preparation, which when entrained in a given polymer coating material, blocks at least 90% of near infrared light at wavelengths of 1400 nm or greater. In still further exemplary embodiments, there is provided an indium-tin-oxide nanoparticle preparation, which when entrained at a concentration of about 6%, on a weight/weight basis, in a given polymer coating material and applied to a glass substrate at a thickness of about 6 microns, blocks at least 90% of near infrared light at wavelengths of 1400 nm or greater.

BRIEF DESCRIPTION OF THE FIGURES

Exemplary embodiments will now be described, with references to the accompanying drawings wherein.

DESCRIPTION OF THE EXEMPLARY EMBODIMENTS

Figure 1:
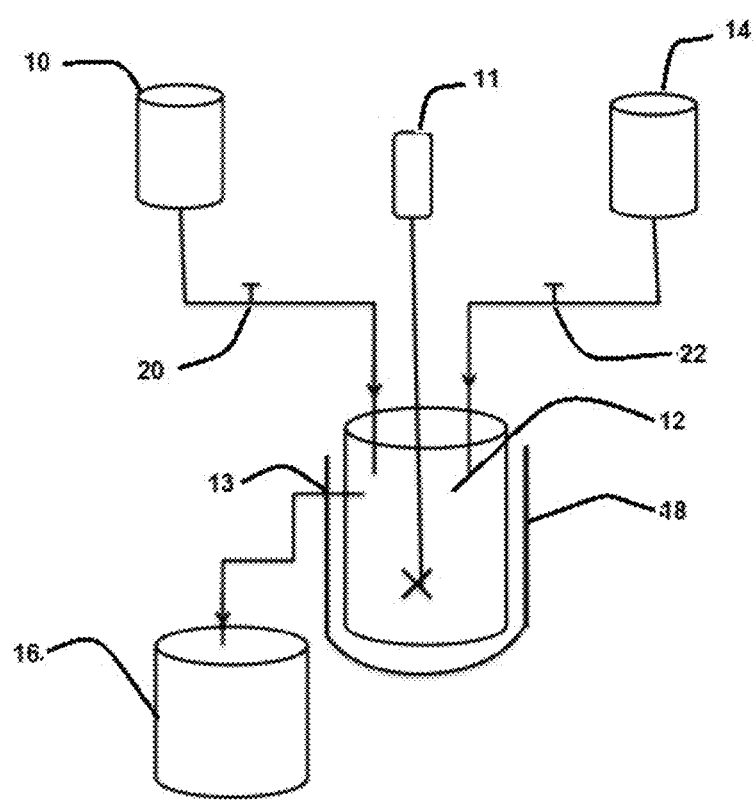
FIG. 1 is a schematic representation of an exemplary apparatus for continuously producing indium-tin precipitated nanoparticles.

In some exemplary embodiments, a continuous method is provided for the preparation of powders and dispersions of precipitated indium-tin nanoparticles and indium-tin-oxide nanoparticles with a substantially homogenous indium-to-tin composition ratio, having a desired particle size range and shape. Exemplary uses of such nanopowders are also provided herein. In addition, a method for the production of an indium-tin-oxide nanopowder with a substantially homogeneous ratio of indium to tin throughout the precipitation reaction is provided where the resultant stable indium-tin-oxide nanoparticles may have improved optical and electrical properties owing to improved consistency and reliably with regard to the indium-to-tin ratio in the final product.

Briefly, the process described herein comprises preparing a seeding solution including at least one indium salt, at least one tin salt, at least one solubility modifier and at least one base in a required amount of a solvent such as, for example, water so as to form intermediate indium compounds and intermediate tin compounds having a general formula expressed as [M(OH)$_x$C$_y$], where M is an indium or tin ion, and C is the cationic part of the at least one indium salt or the least one tin salt, x is a number greater than 0 and y=[M valence−x]/C valence. The solubility modifier may, as used herein, also be referred to as a solubility agent. Furthermore, the seeding solution has a pH of from about 0 to about 3. The seeding solution is then continuously introduced into a reactor vessel. A base solution is also continuously introduced into the reaction vessel such that the intermediate indium compounds and intermediate tin compounds co-precipitate. The introduction of the base solution and the seeding solution into the reactor vessel is controlled at an adjustable rate, such that the pH of the resultant reaction mixture in the reaction vessel is maintained at greater than 3, and that the ratio of unprecipitated or unreacted intermediate indium and tin compounds is maintained substantially constant.

The precipitation reaction of the intermediate indium and intermediate tin compounds and the base solution in the reaction vessel is carried out continuously under substantially constant reaction conditions, such as temperature and pH as well as the ratio of reacting indium-to-tin compounds in a reaction vessel, such as in a stirred tank reactor equipped with mechanical stirrer. In some embodiments, a thermal jacket is provided to control the temperature of the contents of the reaction vessel, and inlet and outlet feeds are provided so as to introduce the seeding solution containing the intermediate indium and tin compounds and the base solution into the reaction vessel.

The seeding solution and the base solution, feeding continuously into the reaction vessel, have a substantially constant pH, and are provided at a substantially constant temperature, which is also maintained in the reaction vessel as the reaction proceeds. Furthermore, the ratio of indium to tin compounds, enabling the precipitation of a mixture of crystalline and amorphous indium-tin nanoparticles, is maintained substantially constant throughout the reaction time owing to the continuous feeding into the reaction vessel of reacting components. The amount of seeding solution and base solution are simultaneously fed into the reaction vessel, such that they may replace depleting reacting compounds, thus keeping the reactant concentrations constant throughout reaction, such that the ratio of indium to tin in the resultant precipitated indium-tin nanoparticles is consistent, unlike that in batch processes, as is shown below in the examples, with particular reference to Example 8.

The resultant precipitated indium-tin nanoparticles, having a substantially consistent indium-to-tin ratio throughout the continuous reaction process, may be useful in the production of indium-tin-oxide nanoparticles or powders that have a substantially consistent indium-to-tin ratio throughout the sample. For example, such nanoparticles may be used for making suspensions, dispersions and powders therefrom. As a result of the consistent ratio of indium to tin in the produced indium-tin nanoparticle precipitate, indium-tin-oxide suspensions, dispersions and powders containing the nano-scale particles may show improved, or more consistent optical and electrical performance since the particles have a substantially consistent ratio of indium to tin, unlike in conventional processes where the ratio of indium to tin in the resultant particles varies from those produced from when the reaction is commenced to those produced from just before the reaction is completed. A comparison of the ratio of indium to tin versus time with regard to the continuous process of the instant disclosure and a conventional process is shown in Table 1 of Example 8, below.

The resulting indium-tin-oxide suspensions, dispersions and powders made according to the instant disclosure include nano-scale particles of a desired shape and/or particle size range distribution as may be required for various applications. Furthermore, the process may be adjusted by adjusting the reaction parameters, as noted below, so as to obtain desired nanoparticles, as noted herein.

Briefly, the process, as disclosed herein, includes preparing a seeding solution and a base solution and where the above two feed solutions are flowed through two corresponding inlets into a continuous mixing reactor or reaction vessel where the reaction takes place. The two feed solutions and reaction solution are as follows:

1) A seeding solution includes at least one indium salt, at least one tin salt, at least one solubility modifier and at least one base in a required amount of a solvent, such as, for example, water. Intermediate indium and tin compounds of the general formula $[M(OH)_xC_y]$ are thus formed in the seeding solution where M is an indium or tin ion, and C is the cationic part of the indium salt or tin salt, x is a number greater than 0 and y=[M valence−x]/C valence. The pH of the seeding solution and concentration of the solubility-modifying agent are adjusted so as to maintain the intermediate indium and tin compounds in solution to near the onset of precipitation. The seeding solution, furthermore, has a pH of from about 0 to about 3.

The seeding solution is therefore a clear intermediate indium compound and intermediate tin compound solution containing one or more solubility modifying agents and at least one base where the intermediate indium compounds and intermediate tin compounds are maintained near the onset of precipitation. The seeding solution may also be aged, as required. Additionally, for example, the seeding solution may be kept at a substantially constant pH level and temperature.

2) A base (or second) solution is provided having a substantially constant pH.

3) The reaction vessel, at the outset of the precipitation reaction contains a basic solution and/or water, forming the reaction solution, having a substantially constant pH and is kept at a substantially constant temperature.

The simultaneous addition of the seeding solution and the base solution into the reaction vessel leads to the reaction of the intermediate indium and tin compounds with the base solution and the production of a mixture of crystalline and amorphous precipitated indium-tin nanoparticles with a substantially consistent indium-to-tin ratio. The rate of addition of the seeding solution and the base solution is adjusted to maintain the pH in the resultant solution in the reaction vessel at a substantially constant pH and substantially constant temperature and substantially constant reactants concentration. Therefore, while the addition of unreacted seeding solution and base solution into the reaction vessel is taking place, the precipitation conditions in the reaction vessel are kept substantially constant. Thus, the ratio of intermediate indium compounds and intermediate tin compounds remains substantially constant in the reaction vessel resulting in the precipitated indium-tin nanoparticles having a substantially consistent indium-to-tin ratio. At any time the contents of reactor are substantially all precipitated nanoparticles in a solvent such as, for example, water mixed with (Salt) by-product of the precipitation reaction since the seeding solution is prepared to near the onset of precipitation for the intermediate indium and tin compounds. The precipitation conditions may be adjusted to produce precipitated nanoparticles of desired particle size and shape. The overflow of formed precipitated nanoparticles, after a given residence time within the reaction vessel, is collected in the collecting tank for further processing. The contents of the collecting tank is mixed and its pH adjusted by adding base, if needed.

The formed indium-tin nanoparticles are washed and dried. Cleaned nanoparticles are heat-treated and/or calcinated in the air and/or followed by heat-treatment under reducing conditions until blue indium-tin-oxide nanoparticles, having a substantially consistent indium to tin composition ratio required for the desired ITO nanopowders are produced. The indium-tin-oxide, in addition to having a substantially consistent indium-to-tin ratio, may also have a desired particle size range and particle shape.

High concentration dispersions or paste of substantially consistently-shaped nano-scale particles, having a given particle size range and substantially consistent indium-to-tin ratio, may then be prepared using a mixture of one or more surfactants. Such dispersions may then be used in the manufacture of coating materials or for other desired applications.

In some exemplary embodiments, a process is provided for preparing a powder of indium-tin-oxide wherein the reaction conditions are adjustable such that the resultant indium-tin-oxide (also referred to herein as ITO) nanoparticles have a desired particle size range, particle shape and substantially consistent indium-to-tin ratio. For example, the indium-tin oxide nanoparticles may be spherical, oblong, or plate-like wherein the average particle size range is from 10 nm to 200 nm.

The indium-tin-oxide powders, as produced according to the methods as described herein, in some exemplary embodiments, comprise a tin-doped indium oxide. The proportion of tin, based on the sum of indium and tin in the compositions may be, for example, from about 2% to about 20%, by weight. The proportion of indium, based on the sum of indium and tin in the composition, may be, for example, from about 80% to about 98%, by weight.

In some exemplary embodiments a continuous process is disclosed herein for producing indium-tin-oxide nanoparticles with a portion of indium from about 80% to about 98% by weight, and in some instances from about 88% to about 95%, by weight. The portion of tin may be from about 2% to about 20%, by weight, and in some instances, from about 5% to about 12%, by weight. Furthermore, the sum of the indium and tin portions may be at least 99.99%, by weight, of the mass of the resultant ITO nanopowders.

In some exemplary embodiments, the indium-tin-oxide nanopowders, produced as disclosed herein, have a crystalline phase wherein a majority fraction is crystalline in form of cubic indium-tin-oxide.

It may be acceptable, in some exemplary embodiments, that the indium-tin-oxide nanoparticles contain impurities. The acceptable degree of the impurities contained therein depends on the desired end use of the ITO nanopowder by a user. Reactant impurities such as, for example, $SO_4^{2-}$, Ca, Co, Cu, Fe, Ni, Pb, Zn, K, Na, may be present. A reactant suitable for use in the processes as described herein may be considered to be a pure reactant if the content of $SO_4^{2-}$, Ca, Co, Cu, Fe, Ni, Pb, Zn is below 0.005% by weight and the content of Na and K is below 0.01% by weight. Compounds introduced via the process, for example, $NH_4^-$ and chlorine, may be substantially removed, if required.

According to the present disclosure the produced indium-tin-oxide nanopowder comprises about more than 99%, for example from about 99% to about 99.99%, pure indium-tin-oxide having a substantially homogenous composition in terms of the particle size range, particle shape and indium-to-tin ratio with less than 1%, for example from about 1.0% to 0.001% of impurities. As such, a continuous process is provided to produce nanoparticles of indium-tin-oxide having a substantially homogeneous composition in terms of the ratio of indium to tin, where the process may be adjustable so as to obtain a desired particle size range and particle shape. As is shown, for example in Examples 1 to 7 below, the particle shape and size range may be selected dependent on the solubility modifier chosen for the seeding solution and the pH of the precipitation reaction. The process provides for making precipitated indium-tin nanoparticles, where the seeding solution and base solution are fed simultaneously into a stirred tank reactor at a substantially constant temperature and substantially constant pH. During the two-solution continuous precipitation process of intermediate indium and tin compounds with the base solution to obtain the indium-tin precipitated nanoparticles, the pH in the reactor is kept substantially constant by adjusting the feeding rates of the seeding and base solutions, as required. The temperature of reaction is also kept substantially constant. During the precipitation of the indium-tin nanoparticles from the intermediate indium and tin compounds and base solution in the reactor, the contents of reactor are mostly precipitated indium-tin nanoparticles mixed with a solvent such as, for example, water and precipitation by-products (salts).

According to the processes described herein, plate-type nanoparticles may be produced where the pH of reaction is kept substantially constant in the range of from about 3 to about 6 and in some embodiments, from about 3.5 to about 5.5, and the temperature is maintained in the range of from about 40° C. to about 60° C. and in some embodiments, at about 50° C. The pH of mixture in the collecting tank is maintained in the range of from about 9 to about 10.

According to the processes described herein, spherical nanoparticles may be produced where the pH of reaction is kept substantially constant in the range of from about 9 to about 13 and in some embodiments, from about 9.5 to about 12 and the temperature is maintained at from about 20° C. to about 50° C. and in some embodiments at room temperature (from about 20° C. to about 24° C.). The pH of the mixture in the collecting tank is maintained at from about 9 to about 13.

In some embodiments, the base may be selected from primary, secondary, tertiary, aliphatic aromatics or amines; tetramethylammonium hydroxide; NaOH; KOH; ammonia; ammonium hydroxide and/or mixtures thereof. In some exemplary embodiments, the base is ammonium hydroxide. Furthermore, the pH of the base solution may be provided at a pH of from about 10 to about 14.

The residence time of the precipitation, for a given particle, for example, in the reactor vessel may be from about 15 minutes to about 300 minutes. In other embodiments, the residence time in the reaction vessel for the precipitation and precipitates may be from about 30 minutes to about 120 minutes. Furthermore, the same selected base as used in the base solution may be used to maintain pH substantially constant during the residence time, if required.

With respect to the two solutions noted above, the seeding solution and the base solution, the following is provided. The seeding solution is prepared by adding at least one indium salt, at least one tin salt, at least one solubility modifier and at least one base to a required amount of a solvent such as, for example, water and mixed using a stirrer so as to form intermediate indium and tin compounds having the general formula $[M(OH)_xC_y]$ where M is an indium or tin ion, and C is the cationic part of indium or tin salt introduced to seeding solution, x is a number greater than 0 and y=[M valence−x]/C valence. However, other solvents, aside from water, such as for example alcohols, may be used as would be readily apparent to a person of ordinary skill in the art. The pH of solution and concentration of the solubility-modifying agent are adjusted so as to maintain the intermediate indium and tin compounds in solution near the onset of precipitation. The pH of the seeding solution, maintained near the onset of the precipitation, is provided such that the addition of addition base causes the intermediate indium compounds and intermediate tin compounds to precipitate to the indium-tin nanoparticles, for example when the base solution and the seeding solution are continuously introduced to one another. Therefore, the ratio of indium to tin in the indium-tin nanoparticles is substantially the same as that in the seeding solution since the seeding solution is maintained at the onset of precipitation. Furthermore, in order to maintain the seeding solution at the onset of precipitation, the pH of the seeding solution is from about 0 to about 3.

The seeding solution may be provided as an optically clear solution with no visible opacity so as to ensure that the indium and tin intermediate compounds remain in the seeding solution as unprecipitated compounds and that the precipitation only occurs in the reaction vessel when the indium and tin intermediate compounds react with additional base. Furthermore, the seeding solution may be prepared at substantially constant temperature of from about 20° C. to about 60° C. and then aged for a time period of from about 0.5 hours to about 24 hours. The seeding solution may, for example, be prepared from an indium and tin solution made of a solvent and solute such as, for example, water-soluble metal salts, one or more solubility modifiers and base.

Indium compounds suitable for use in producing the seeding solution may, for example, be indium chloride; indium iodide; indium nitrate; indium acetate; indium sulfate; indium alkoxides, such as indium methoxide, ethoxide or mixtures of thereof, where the indium is present in the +3 oxidation state or, in the instances of chloride and iodide, in the +1 oxidation state. Tin compounds suitable for use in producing the seeding solution may, for example, be tin chloride; tin sulfate; tin nitrate; tin alkoxides, such as tin methoxide and tin ethoxide or mixtures of thereof, where tin is present in the +4 or +2 oxidation states.

In some exemplary embodiments, the indium and tin compounds for making the seeding solution are mixtures of indium trichloride ($InCl_3$) and tin (IV) chloride.

Furthermore, solubility modifying agents or solubility modifiers suitable for use in producing the seeding solution may, for example, be compounds containing carboxylic acid, hydroxyl-acid, amine, amide or mixtures thereof or any other compounds, which may enhance the solubility of indium and/or tin in presence of a base, such as, for example, a co-solvent. In some exemplary embodiments the solubility modifying agent compounds may be do-decyl amine, decylamine, tartaric acid, citric acid, β-alanine, methyl amine, ethyl amine, n- and i-propyl amine, butyl amine, poly-ethylene amine, caprolactam and/or nonanolactam. Additionally, the concentration of the one or more solubility modifying agents in the solution may be from about 0.75 moles to about 2.0 moles per mole of tin. Furthermore, the molar ratio of the base component to tin may be from about 0.5 to about 3.0.

The one or more bases used in the base solution may, for example, be sodium hydroxide; potassium hydroxide; ammonium hydroxide; tetramethylammonium hydroxide; ammonia; and/or primary, secondary and tertiary aliphatic and/or aromatic amines. In some exemplary embodiments, the base for making base solution is ammonium hydroxide. The base solution may be prepared and kept at substantially constant temperature of from about 20° C. to about 60° C.

In some exemplary embodiments, during the addition of the seeding solution and the base solution to reaction solution, in the continuous process described herein, the reaction solution may be kept in the mixing reactor vessel at a stirring rate of 200 rpm to about 700 rpm. The temperature of reaction solution furthermore may be maintained in the range of from about 20° C. to about 60° C. and at a desired, but substantially constant, pH. For example the pH of the reaction solution may be kept at about greater than 3 units. Additionally, the seeding solution and the base solution, as added to the reaction vessel and react to form indium-tin nanoparticles may have a residence time in the reaction vessel of from about 15 minutes to about 300 minutes and in some embodiments from about 30 minutes to about 120 minutes, so as to allow the precipitation reaction to proceed with the required degree of mixing.

In some exemplary embodiments, the seeding solution and the base solution may be fed into the reaction solution at a feed rate that allows keeping the mixing rate, temperature and pH of reaction solution in the reaction vessel substantially constant and further allowing the residence time of reaction be from about 15 minutes to about 300 minutes and in some embodiments from about 30 minutes to about 120 minutes. The resulting mixture is then collected in a collecting tank for additional treatment and pH adjustment, if required. In the collecting tank, the pH is kept substantially constant from about pH 10 to about pH 14 and the temperature is maintained in the range of from about 20° C. to about 60° C. Furthermore, in some exemplary embodiments, the pH of the contents in the collecting tank may be adjusted as desired using a base such as ammonium hydroxide.

In some exemplary embodiments, the contents of the collecting tank may be stirred at a rate of from about 200 rpm to about 700 rpm and for a time period of from about 30 minutes to about 24 hours.

The solid content, that being the so-formed precipitated indium-tin nanoparticles, in the collecting tank may be from about 10% to about 50%. Subsequently, the solid content in the collecting tank may be washed and dried by way of, for example, filtration, evaporation, centrifugation, freeze drying, or spray drying at a required temperature so as to produce a indium-tin nanopowder.

Following washing and drying, the solids content, that being the indium-tin nanoparticles, may, for example, be dried under air at temperatures of from about 120° C. and to about 200° C., under vacuum. The resultant indium-tin dried nanoparticles may then be later heat-treated under air at temperatures of at least 250° C. and less than about 800° C. to produce yellow indium-tin-oxide.

The above heat treatment of the indium-tin precipitated nanoparticles at the aforementioned temperatures may, for example, be performed over a time period of from about 0.5 hours to about 8 hours. In some exemplary embodiments the time period is from about 0.5 hours to about 3 hours, wherein other exemplary embodiments, the time period is about 45 minutes.

In embodiments where the heat treatment of the indium-tin precipitate or yellow indium-tin-oxide nanoparticles is performed under reducing conditions, the temperature may be from about 250° C. to about 400° C. and over a time period of about 0.5 hours to about 8 hours. In some exemplary embodiments, the time period for the heat treatment under reducing conditions may be from about 4 hours to about 6 hours and further still in some exemplary embodiments about 3 hours. Furthermore, for example, the reducing conditions may be provided through the use of a 3% to 10% $H_2/Ar$ gas blanket, with a gas flow rate of from about 300 mL/min to about 500 mL/min.

Figure 2:
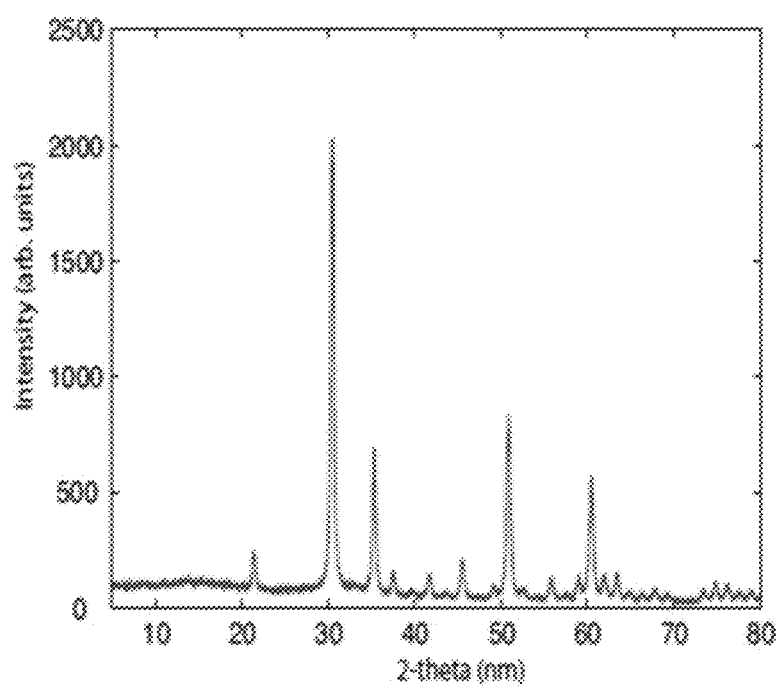
FIG. 2 is a representative XRD spectrum of nanoparticles of ITO produced according to conditions described in Examples 1 to 7.

Dependent on the reaction conditions used in the process as disclosed herein, the desired shape and particle size range of the obtained nanopowders of indium-tin-oxide, may include, as at a least major portion, cubic crystalline formed indium-tin-oxide nanoparticles with a particle size ranging from about 15 nm to about 26 nm. The reactions may be further characterized in that, independent of the precipitation conditions, the indium-tin precipitated nanoparticles at a given moment in the reaction vessel, that being in the mixture, have a substantially homogenous indium-to-tin ratio substantially equal to the molar content in the original seeding solution. For example, at a given point throughout the reaction process the precipitated indium-tin nanoparticles have a substantially homogenous composition, as verified by EDX analysis, as is shown in FIG. 2, for example, and discussed in Examples 1 to 7, equal to the molar ratios present in the seeding solution. In particular the tin-to-indium ratio, based on the weight of indium and tin in the seeding solution, may be from about 0.09 to about 0.11 with respect to the exemplary embodiments noted herein and as shown in Table 1 of Example 8. However other ratios are possible depending on the ratios in the seeding solution, for example X percent tin by weight, where X is chosen from a number of between greater 0 to less than 100 percent tin in the seeding solution.

In another aspect of the instant disclosure there is provided a process for incorporating the indium-tin-oxide nanoparticles resultant from the above-disclosed process in a dispersion. The process for preparing the indium-tin-oxide dispersion is disclosed below wherein the indium-tin-oxide nanoparticles are mixed with one or more dispersion solvents so as to provide a dispersion mixture. The indium-tin-oxide nanoparticles are formed into the dispersion mixture, in some exemplary embodiments, by means of a dispersing unit having added thereto liquid constituents or solvents, which, in some exemplary embodiments may be optionally removed from the dispersion mixture in order to obtain a nanopowder with desired characteristics.

Dispersing apparati suitable for use in the process may include mills, kneaders, roll mills, and/or high energy mills in which two or more dispersing streams collide with one another at pressures of from about 1000 bar to about 4000 bar. In particular, planetary ball mills, stirred ball mills, mortar mills and/or three roll mills may be desirable. Additionally, dispersion by means of ultrasound is likewise suitable.

As noted above, the dispersion may be carried out with addition of one or more liquid constituents or solvents. Suitable liquid constituents may be: water; alcohols, for example, methanol ethanol, n- and isopropanol and butanol; glycols and glycol esters, for example ethylene glycol, propylene glycol, or butylene glycol, the corresponding di-, tri-, tetra-, penta-, or hexamers and the corresponding mono- or diethers, where one or both hydroxyl groups are replaced by, for example, a methoxy, ethoxy, propoxy, or butoxy group; ketones for example acetone and butanone; esters, for example ethyl acetate; ethers, for example diethyl ether, tetrahydropyran, and tetrahydropyran; amides, for example dimethylacetamide and dimethylformamide; sulphoxides and sulphones, for example sulpholane and dimethyl sulphoxide; aliphatic hydrocarbons for example pentane, hexane and cyclohexanone; polyols, for example 2-methyl-2,4-pentanediol; polyethylene glycols and ethers thereof, such as diethylene glycol, diethylene glycol, tetraethylene glycol, diethylene glycol diethyl ether, tetraethylene glycol dimethyl ether or diethylene glycol mono butyl ether; ethylene glycol; diethylene glycol; diethylene glycol mono butyl ether; 3,6,9-trioxadecanoic acid; beta-alanine; polyoxyethylene(20); Tego 752W; Disperbik 192; sorbitan monooleate; caprolactam; citric acid; glycolic acid and/or malic acid. Furthermore, in some exemplary embodiments, mixtures of solvents, such as those noted above, may be used.

In some exemplary embodiments, the dispersion process for the preparation of a well-dispersed indium-tin-oxide paste containing therein indium-tin-oxide nanoparticles produced according the method also disclosed herein where the paste with substantially a uniform composition, may further include adding a mixture of surfactant agents and/or other additives to the dispersion. The indium-tin-oxide paste as disclosed herein may comprise a viscose dispersion of indium-tin-oxide having, on a weight/weight (W/W) basis, an indium-tin-oxide nanoparticle concentration of from about 10% to about 80%. Additionally, the indium-tin-oxide paste may further comprise one or more surfactants, and/or agents acting in a similar fashion, in a concentration range of from about 2% to about 40% W/W relative to the total mass of the ITO nanoparticles also contained therein. Surfactants suitable for use in the exemplary embodiments disclosed herein may be water-soluble small molecules, a cationic surfactant, an anionic surfactant, a non-ionic surfactant, an amphoteric surfactant, oligomers and/or polymers having acid, base, ether, amine, ester and other water soluble functional groups and/or a mixture of these and other functional groups. Furthermore, suitable surfactants may, for example, be cationic, anionic, non-ionic and amphoteric surfactants, polyethylene oxide derivatives where such derivatives may be saturated or unsaturated (mono) carboxylic acids, for example, with the carboxylic acids having more than 7 carbon atoms, preferably more than 11 carbon atoms, for example polyethylene oxide derivatives with stearic acid, palmitic acid or oleic acid. Other polyethylene oxide derivatives may have sorbitan esters, in which case useful carboxylic acids may include, for example, those mentioned above. In addition, it may be possible to use polyethylene oxide (mono)alkyl ethers, for example with alcohols having more than 7 carbon atoms, and in some instances, more than 11 carbon atoms. In some embodiments, for example, organic carboxylic acids, anhydrides or acids amides may be desirable and/or the use of copolymers of ethylene glycol-maleic acid as a surfactant. Therefore, in some exemplary embodiments, there is provided a dispersion comprising a surfactant and indium-tin-oxide nanopowder formed into a paste.

Furthermore the well-dispersed indium-tin-oxide paste, as noted above, may be incorporated into coating materials to provide infrared light blocking properties to the coating materials.

With reference to FIG. 1, an exemplary schematic embodiment is shown representing an exemplary continuous process apparatus for the continuous precipitation so as to obtain precipitated indium-tin nanoparticles having a substantially homogenous indium-to-tin composition ratio. First feed tank 10 provides a variable continuous flow rate, via a first flow controller 20, of a seeding solution prepared as discussed above. The seeding solution is fed to the reaction vessel 12 via a tube in fluid communication therewith. Similarly a second feed tank 14 provides the base solution at a continuous variable flow rate, via second flow controller 22, to the reaction vessel 12 via tubing in fluid communication with the reaction vessel. The base solution is provided, as noted above, for adjusting the pH of the reactant mixture as desired, and for initiating the precipitation reaction. The mixture is continuously stirred by, for example, a mechanical stirrer 11 so as assist the seeding solution, including the indium and tin intermediate compounds, and the base solution to react so as to form, by way of precipitation, the precipitated indium-tin nanoparticles in the mixture. As noted above, the feed rates of adding the seeding solution and the base solution to reactor are adjusted so that the precipitate may have a residence time in the reaction vessel of from about 15 minutes to about 300 minutes so as to allow the precipitation materials to proceed with the desired level of mixing. As the seeding solution and the base solution enter reactor, they react substantially immediately such that nearly all of indium and tin in the reactor vessel are in the form of precipitate. Given that the process is a continuous process, as more of the seeding solution and base solution are added to the reaction vessel 12 and precipitated indium-tin nanoparticles in the mixture are produced, the collecting tank 16 is located to receive overflow 13 of the precipitated mixture containing therein a mixture of crystalline and amorphous indium-tin nanoparticles. The collected indium-tin precipitated nanoparticles are then, as desired, removed from the collecting tank 16, washed and dried prior to the heat treatment steps. The reaction vessel 12 is also equipped with a heating/cooling jacket 18 to allow control of the temperature of the mixture in the reaction vessel 12, as required.

EXAMPLES

Nanoparticles of indium-tin precipitate produced by the continuous precipitation process as disclosed above are discussed below with respect to the following examples wherein the indium-tin-oxide nanoparticles have a substantially consistent indium-to-tin ratio composition with optical and electronic properties for use in, for example, coatings and other applications.

Example 1

Figure 4:
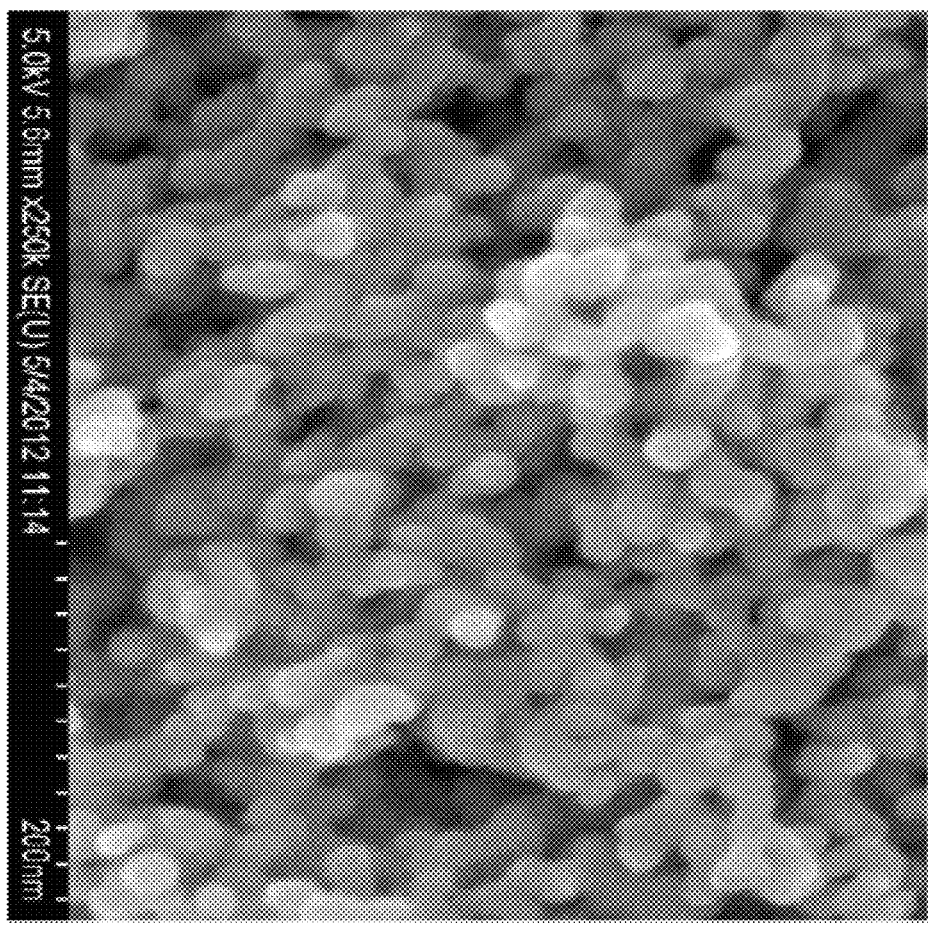
FIG. 4 is a SEM image of spherically-shaped indium-tin-oxide nanoparticles synthesized according to the process described in Example 1.

A seeding solution was prepared at 50° C. by dissolving 118.8 g indium (III) chloride, 14.19 g of tin (IV) chloride, 3.6 g of caprolactam as a solubility modifying agent, in 900 mL of water and 7.5 mL ammonia. The seeding solution was determined to have a pH after mixing of <1 pH units. The seeding solution was placed in the first feed tank 10 and kept at a substantially constant room temperature and substantially constant pH of 0.5. The seeding solution had a tin to indium ratio of 10.6% or about a ratio of 10:90. The base solution was provided as 129 mL of concentrated ammonium hydroxide with a pH of 12 and was placed in the second feed tank 14. The temperature of the base solution was kept at a substantially constant room temperature, along with a substantially constant pH of 12. The seeding solution and the base solution were fed concomitantly into stirred reaction vessel 12 having therein 300 mL of concentrated ammonium hydroxide with a pH 12 and kept at substantially constant room temperature and substantially constant pH of 12. The continuous reaction was performed at room temperature with the seeding solution and the base solution added to the reaction vessel 12, each at a rate of 10 mL/min at the outset of the continuous process. The rate of addition for the base solution was adjusted so as to maintain the pH of the mixture substantially constant at 12 pH units. The mixture in the reaction vessel 12 was mixed at a rate of 700 rpm. During the reaction, samples were taken for compositional analysis. The results showed precipitated nanoparticles having a consistent tin to indium ratio of about 10.6% (a ratio of about 10:90) throughout reaction at the various time points. After 200 ml of mixture, having therein indium-tin nanoparticles, was collected in the collecting tank 16, the reaction was terminated. The content of collecting tank was mixed for 1 hr. Subsequently the solids portion in the collection tank 16 was separated by centrifugation and washed several times with Millipore™ water until no chloride was detected in the wash water. The nanoparticles were then dried. The resultant particles had average particle size of 20 nm in diameter. The dried resultant indium-tin nanoparticles were further heat-treated at 700° C. for 30 minutes until a yellow powder of indium-tin-oxide was obtained and then further treated at 350° C. for 3 hours under an $H_2$/Ar gas blanket (10% v/v). A blue coloured powder of substantially spherically-shaped ITO nanoparticles was obtained having a substantially consistent tin to indium ratio of 10.6% corresponding to a indium weight percent of 90.38 and a tin weight percent of 9.62 and average particle size of 19.6 nm with a particle size distribution in range of 10 nm to 40 nm. A SEM image of the nanopowder is shown in FIG. 4. XRD analysis (FIG. 2) of the blue powder showed the product of this reaction is an indium doped tin oxide.

12 g of the blue coloured nanopowder of ITO was mixed with 4.2 g of ethylene glycol and 4.2 g of copoly(acrylic acid/maleic anhydride) as surfactants and sonicated for 45 minutes. The powder easily dispersed creating a high viscosity dark blue liquid, thus forming an indium-tin-oxide dispersion.

Figure 5:
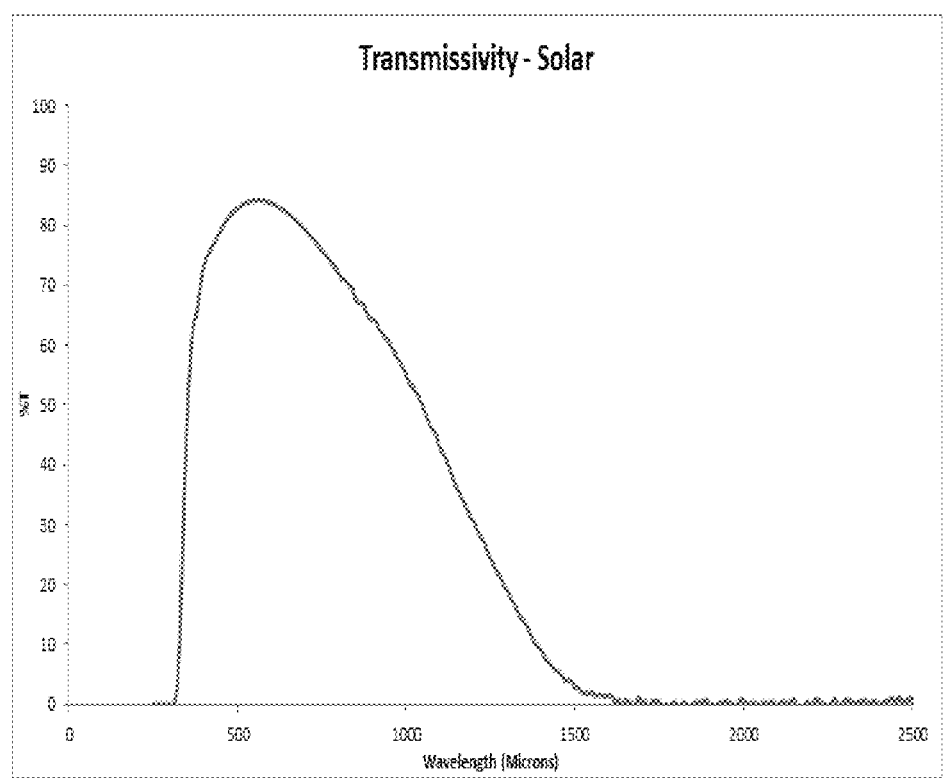
FIG. 5 is an UV-Vis-NIR plot of films containing nanoparticles synthesized using the continuous process described in Example 1.

A measured amount of paste was dispersed in a waterborne polyurethane resin dispersion (50% w/w) and mixed for 20 minutes using a homogenizer to create a 6% w/w dispersion. The liquid was cast onto 3 mm clear glass slides using a #12 bar. The dry film thickness was about 6 microns. The UV-Vis-NIR characteristic of the coating indicates an optically clear coating with no visible defects and IR shielding properties with shielding of over 90% of NIR at wavelengths higher than 1700 nm as is shown in FIG. 5.

Example 2

A seeding solution was prepared at 50° C. by dissolving 118.8 g Indium (III) chloride, 14.19 g of tin (IV) chloride, 3.6 g of caprolactam as a solubility modifying agent, in 900 mL of water and 12.6 mL ammonia. The seeding solution was determined to have a pH after mixing of <1 pH units. The seeding solution was placed in the first feed tank 10 at a substantially constant room temperature and a pH of 0.5. The tin to indium ratio in the seeding solution was 10.6% (10:90). The base solution was provided as 267 mL ammonium hydroxide diluted with 450 mL of water, and placed in the second feed tank 14. The temperature of the base solution was kept at a substantially constant room temperature and at a substantially constant pH of 10. The first and second flow controllers 20 and 22 were opened for the simultaneous addition of the seeding solution and the base solution into the reaction vessel 12 containing 900 mL of water at 50° C. The reaction taking place in the reaction vessel 12 was kept at 50° C. and at a substantially constant pH of 3.5. The rate of addition for the base solution was adjusted, as required and maintained such that in the reaction vessel 12, the pH was maintained substantially constant at 3.5 pH units. The mixture was mixed at the rate of 650 rpm in the reaction vessel. During the reaction samples were taken for compositional analysis. The results showed production of precipitated nanoparticles having a consistent tin to indium ratio of about 10.6% (10:90) throughout reaction. After 200 ml of the mixture, having therein precipitated indium-to-tin nanoparticles was produced and collected in the collecting tank, the reaction was terminated. Closing the inlets 20 and 22 stopped the reaction. Subsequently, the pH of the contents of the collecting tank was adjusted to a pH of 10 by adding the required amount of concentrated ammonium hydroxide and mixed for additional 1 hour at room temperature. The precipitated indium-tin nanoparticles were separated by centrifugation and washed several times with Millipore™ water until no chloride was detected in the wash water. The nanoparticles were then dried. The nanoparticles obtained were shown to have a plate-like shape by SEM imaging with XRD pattern showing a crystalline mixture of indium and tin hydroxide.

Figure 3:
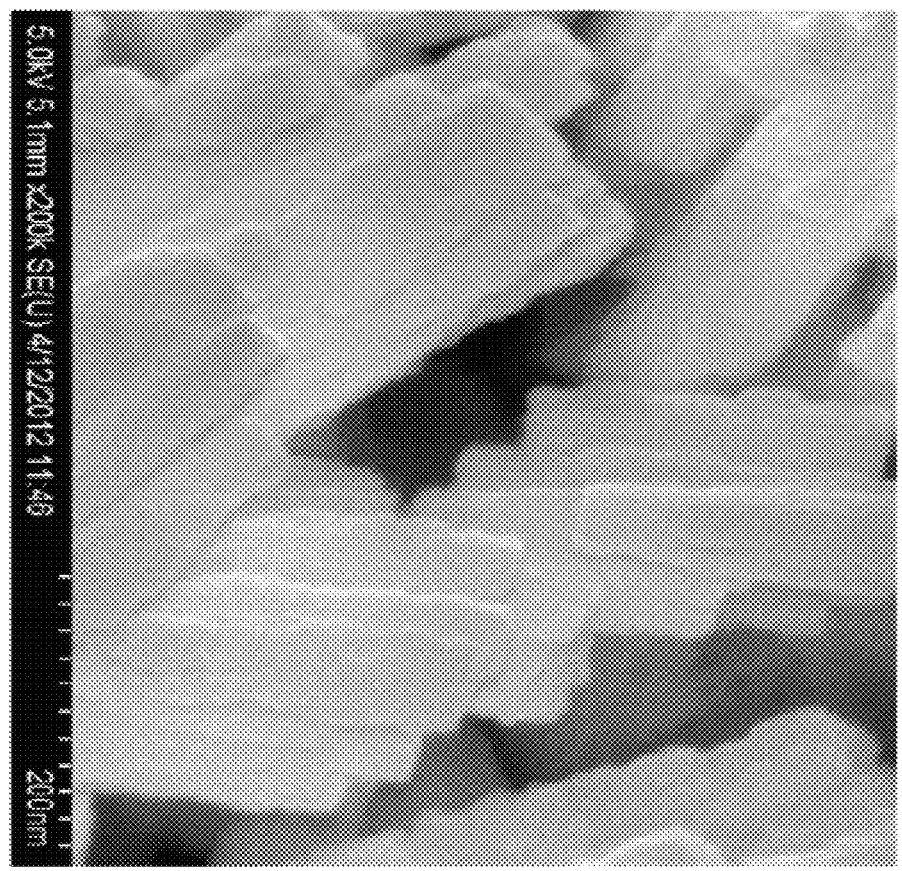
FIG. 3 is a SEM image of plate-like shaped indium-tin oxide nanoparticles synthesized according to the conditions described in Example 2.

SEM imaging of the produced nanoparticles indicated that ITO nanoparticles with plate dimensions of about 60 nm×200 nm where produced, as shown in FIG. 3. The dried powders were further heat treated in air at 700° C. for 30 minutes until a yellow powder of indium-tin-oxide was obtained and then further treated at 350° C. for 3 hours under an $H_2$/Ar gas blanket (10% v/v). An indium-tin-oxide nanopowder having plate-like shaped nanoparticles of the indium-tin-oxide was obtained having a substantially constant indium/tin ratio of 10.5% (a ratio of about 10:90) corresponding to an indium weight percent of 90.4 and a tin weight percent of 9.6.

Examples 3a and 3b

Example 3a is a repetition of Example 1 however a different solubility-modifying agent was used. The 3.6 g of caprolactam in the seeding solution of Example 1 was replaced with 2.12 g of decylamine. The remainder of materials and process conditions were identical to those disclosed in Example 1. The obtained precipitate of indium-tin nanoparticles were processed following the procedure described in Example 1. A spherically-shaped, light blue colour, nanoparticle powder was obtained having a substantially constant indium-to-tin ratio of 10.6% corresponding to a indium weight percent of 90.38 and a tin weight percent of 9.62 with an average crystal size of about 30 nm. XRD data for this sample was the same as Example 1, which is consistent with a cubic phase indium-tin-oxide.

Example 3b is a repetition of Example 3a however a different solubility modifying agent was used. The 2.12 g decylamine in the seeding solution of Example 3a was replaced with 3.2 g of dodecylamine. The remainder of materials and process conditions were identical to those disclosed in Example 3a. The obtained precipitate of indium-tin nanoparticles were processed following procedure described in Example 1. A spherically-shaped, light blue colour, nanoparticle powder was obtained having a substantially constant indium-to-tin ratio of 10.6% corresponding to a indium weight percent of 90.4 and a tin weight percent of 9.6 with an average crystal size of about 30 nm. XRD data for this sample was the same as Example 1, which is consistent with a cubic phase indium-tin-oxide.

Examples 4 and 5

The process described in Example 1 was repeated, however the solubility-modifying agent of caprolactam was replaced with tartaric acid or citric acid. The amount of tartaric acid or citric acid was 1:1 mole based on the tin content in seeding solution. The obtained precipitate of indium-tin nanoparticles was processed following the procedure described in Example 1. A spherically-shaped, light blue coloured nanoparticle powder was obtained having a substantially constant indium-to-tin ratio of 10.6% corresponding to an indium weight percent of 90.38 and a tin weight percent of 9.62 with an average crystal size of about 23 nm for tartaric acid and about 26 nm for citric acid. The XRD data from both samples was shown to be the same as that in Example 1, which is consistent with a cubic phase indium-tin-oxide.

Example 6

Example 6 is a repetition of Example 1, however the seeding solution was aged for 24 hours. A spherically-shaped blue coloured powder of ITO nanoparticles was obtained having a substantially constant tin to indium ratio of 10.6% corresponding to an indium weight percent of 90.35 and a tin weight percent of 9.65; with an average particle size of 16 nm and a particle size distribution in the range of 8 nm to 35 nm.

Example 7

A seeding solution was prepared at 50° C. by dissolving 118.8 g indium (III) chloride, 14.19 g of tin (IV) chloride, 3.6 g of caprolactam as a solubility modifying agent in 900 mL of Millipore™ and 7.5 mL ammonia. The seeding solution in this example was determined to have a pH, after mixing, of <1 pH units. The seeding solution was placed in feed tank 10 and kept at room temperature. The base solution was comprised of 228 mL concentrated ammonium hydroxide and was placed in feed tank 14 and kept at room temperature. The seeding solution and the base solution were fed concomitantly into stirred tank reaction vessel 12 having therein a solution of 900 mL of water and 120 mL concentrated ammonium hydroxide at a pH of 10 and temperature of 50° C. The continuous reaction was kept at 50° C. while the seeding solution and the base solution were added at rate of 10 ml/min. The rate of addition for the base solution was adjusted to maintain the pH of the mixture substantially constant at pH of 10 units. During the reaction samples were taken for composition analysis. The results showed production of nanoparticles having a consistent tin to indium ratio of about 10.5% (10:90) throughout reaction. After 200 ml of mixture, having therein indium-tin hydroxyl hydrate nanoparticles, was collected in the collecting tank 16, the reaction was stopped. The content of collecting tank 16 was further mixed for 1 hr. Subsequently the solids in the collection tank 16 were separated by centrifugation and washed several times with Millipore™ until no chloride was detected in the wash water. The nanoparticles were then dried. The indium-tin precipitated nanoparticles obtained were shown to have a spherical shape with XRD pattern showing a mostly amorphous mixture of indium and tin hydroxide. SEM imaging showed particles having an average particle size of 40 nm in diameter. The dried powders were further processed or calcinated at 700° C. for 30 minutes until a yellow powder of indium-tin-oxide was obtained and then further treated at 350° C. for 3 hours under an $H_2$/Ar gas blanket (10% v/v). A blue coloured powder of substantially spherically-shaped ITO nanoparticles was obtained having a substantially constant indium-to-tin ratio of 10.5% with an average particle size of 40 nm and a particle size distribution in the range of 20 nm to 70 nm.

Example 8

Comparative Example

In this comparative example between the instantly disclosed continuous method for producing indium-tin-oxide nanopowders and a conventional method, the resulting indium-tin-oxide nanopowder of Example 1 was compared to an ITO produced by a conventional process is shown. The following method for a conventional process was used, in which 140 g of indium (III) chloride, 18 g tin (IV) chloride penta hydrate and 5.6 g of caprolactam were introduced into 1400 mL of water and stirred. After a clear solution was formed, it was heated to 50° C. After this temperature had been reached, 105 mL of ammonium hydroxide solution (25% strength) was added drop-wise with vigorous stirring. The suspension was stirred at a temperature of 50° C. for a further 24 hours. For complete precipitation, a further 280 mL of ammonium hydroxide was subsequently added to the mixture. Samples of the formed nanoparticles were tested for indium-to-tin composition during the reaction time. The composition of nanoparticles formed during reaction is compared, below, with those obtained by the continuous process of the instant disclosure as described in Example 1. The comparison is shown in Table 1 and can also be seen in accompanying FIGS. 6a and 6b. As shown in Table 1, the composition or ratio of indium to tin in the formed nanoparticles of the conventional process changes according to the various time points in the progression of the reaction. In sharp contrast, in the case of the instant continuous method, the ratio (or composition) of indium to tin in the formed nanoparticles remains substantially consistent throughout the reaction time. This provides a final indium-tin-oxide nanopowder having a more consistent ratio of indium to tin, based on the initial concentrations thereof in the seeding solution It is also worth noting that when conventionally calculating the ratio of indium to tin for nanoparticles emerging from the conventional process, it is necessary to determine the average ratio across the entire reaction time in conventional processes, that being from samples taken at the beginning, middle and end of the reaction period and as shown in Table 1, for example. In conventional processes this ratio changes depending how long the reaction has been proceeding, thus in a given batch of indium-tin-oxide, there may be a significant portion of particles which do not have the desired indium-to-tin ratio. Even so, in the calculations, on the average ratio of indium to tin, these initially formed nanoparticles are "averaged out" of the total, while the particles still remain in the sample. Furthermore, in some instances, the indium-tin-oxide nanoparticles formed early in the conventional process may not bestow the desired electrical and optical properties for a given application which may otherwise be present in the nanoparticles formed later in the conventional process.

In the continuous method, disclosed herein, and as per the results shown in Table 1, the ratio of indium to tin in the formed nanoparticles remains substantially consistent as compared to conventional processes across the reaction period.

TABLE 1

Composition (ratio) of tin to indium in nanoparticles at different times of precipitation for the herein disclosed continuous process and a conventional process

| Reaction time | Continuous Process with Seeding Solution Input Composition of a 90:10 Indium-to-Tin Ratio | | | Conventional Process with indium-to-Tin Present in a 90:10 Ratio | | |
|---|---|---|---|---|---|---|
| (minutes) | In % | Sn % | Sn/In ratio | In % | Sn % | Sn/In ratio |
| 0 | 90.0 | 10.0 | 0.111 | 99.93 | 0.075 | 0.001 |
| 2 | 90.0 | 10.0 | 0.106 | — | — | — |
| 6 | 91 | 9.0 | 0.096 | — | — | — |
| 10 | 91.0 | 9.0 | 0.099 | — | — | — |
| 30 | 90.0 | 10.0 | 0.106 | 99.52 | 0.483 | 0.005 |
| 70 | 90.0 | 10.0 | 0.106 | 99.02 | 0.978 | 0.010 |
| 300 | Reaction completed | | | 99.38 | 0.619 | 0.006 |
| 1440 | | | | 91.75 | 8.254 | 0.090 |

Figure 6A:
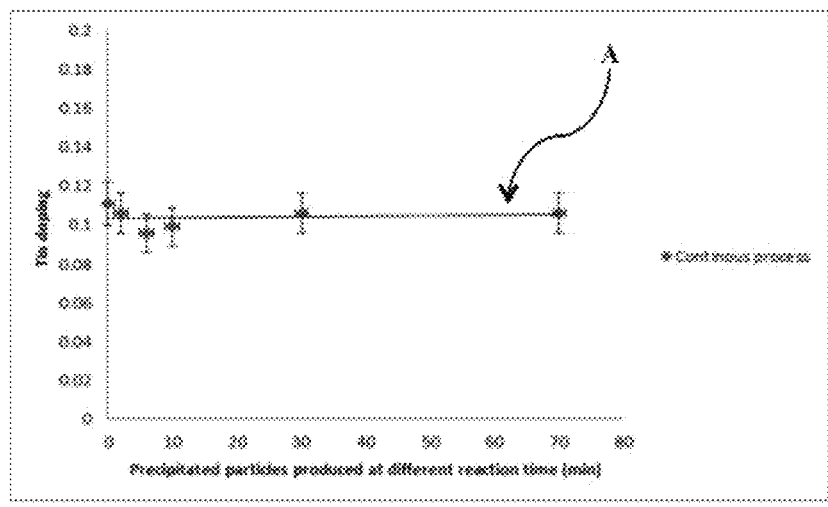
FIGS. 6a and 6b are plots of the percentage of tin doping levels versus time of nanoparticles synthesized according to the continuous process and the conventional process, respectively, as described in Example 8.

Samples taken as a function of reaction time show resulting nanoparticles using the continuous process of the instant disclosure are substantially homogenous (left hand section of Table 1 and FIG. 6a) in composition (for example, an average Sn/In ratio 0.106) throughout the reaction time with ratios staying within a measurement error of +/−10% from one sampling to the next, or along a theoretical line or threshold shown at A of FIG. 6a, corresponding to the raw material input composition in the seeding solution. Thus, in an exemplary embodiment as shown in FIG. 6a it is graphically shown that the resulting indium-tin-oxide nanoparticles from the continuous process of the instant disclosure have a substantially consistent ratio of indium-to-tin during the reaction time as evaluated using percentage tin doping levels that may be within a measurement error of +/−10%.

Figure 6B:
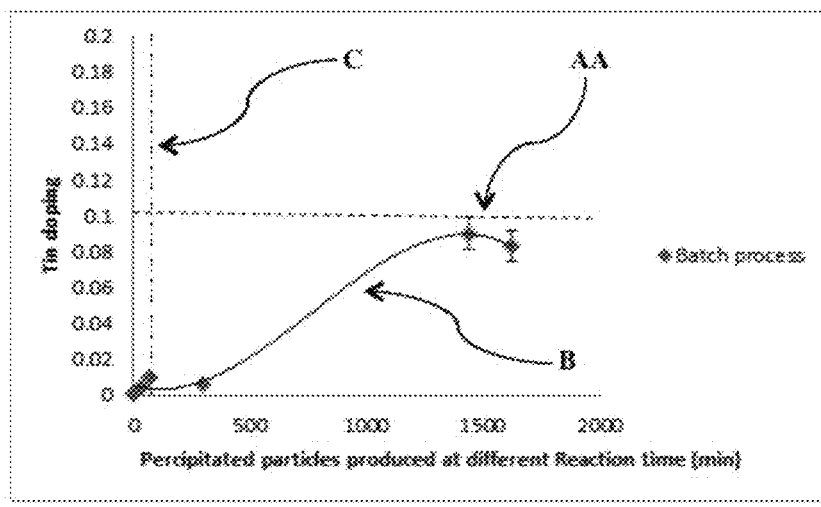

Whereas, in the case of the conventional process, shown at solid line B in FIG. 6b, for comparison, and also in Table 1, the ratio of indium to tin changed significantly over the various time points resulting in a mixture of particles having various ratios of tin to indium, in the range of 0.001 to 0.09 which, as can be noted is a variation of almost 90% from the smallest ratio to the largest ratio. Furthermore, the resultant particles have various ratios of indium-to-tin that are different from the indium-to-tin ratio in the starting materials of about 12.9%, ranging from the 1.0% to 9.0%, as noted above. With respect to FIG. 6b, the hash-dotted line C indicates the time period corresponding the reaction time of line A in FIG. 6a and hashed line AA represents a theoretical extrapolation of line A from FIG. 6a believed to correspond to further time points should the continuous reaction of FIG. 6a be run longer. The extrapolated line AA is a theoretical determination based on the data obtained for line A of FIG. 6a.

Turning again to the comparative example, the white precipitate of indium-oxide-hydroxide formed by the conventional process was centrifuged and washed. The produced powder using the conventional process was processed in the same way as described above. In order to comparatively illustrate the performance of the indium-tin-oxide as produced in accordance with the instant disclosure to that as produced with a conventional process the following is provided. The indium-tin-oxide, having a more consistent indium-to-tin ratio composition, was formed into a dispersion using the heat-treat blue-coloured ITO for the dispersion. The resultant dispersion was then added to a urethane coating material and coated onto a clear 3 mm glass slide using a #12 bar and left to air dry before characterization. A coating was similarly prepared using resultant indium-tin-oxide nanoparticles from the conventional method. The indium-tin-oxide content of the two liquid coatings was 6% w/w. The dried indium-tin-oxide films were determined to have a film thickness of 6 microns, in both cases. The dry coated film, having the indium-tin-oxide made according to the conventional batch process entrained therein, showed less UV-Vis-NIR spectrum-shielding properties as compared the coating having the indium-tin-oxide entrained therein made according to the instant continuous method. The film formed on the glass with indium-tin-oxide particles made according to the conventional process of the instant example thus showed inferior IR shielding characteristics compared to that obtained from film having the indium-tin-oxide nanoparticles of continuous process of the instant disclosure.

TABLE 2

IR shielding properties of coated films of ITO made from an exemplary continuous process and compared with a conventional process. Dispersion and coating conditions for both ITO are the same.

|  | ITO Nanoparticles Made Using a Continuous Process of the Subject Disclosure | ITO Nanoparticles Prepared Using a Conventional Process |
| --- | --- | --- |
| ITO making conditions | As outlined in the Example 1 | As outlined in the Example 8 |
| Composition of ITO(Sn/In) | Input raw materials = 10% tin Reaction products having substantially homogenous composition of 10.6% throughout reaction | Input raw materials = 10% tin Reaction products having different composition during the reaction ranging from 0.1 to 9.0% |
| Concentration of ITO in the coating materials | 6% | 6% |
| Coated film thickness | 6 microns | 6 microns |
| Over 50% NIR blockage wavelength | Higher than 1100 nm | Higher than 1800 nm |
| Over 90% NIR blockage Wavelength | Higher than 1400 nm | Higher than 3000 nm |

Table 2, with particular reference to the last two rows, shows that the continuous process of the instant disclosure for producing indium-tin-oxide nanoparticles having a substantially homogeneous composition, may provide improved optical performance. Without wishing to be bound by theory, evidence indicates that indium-tin-oxide nanoparticles having a substantially consistent ratio of indium to tin among the nanoparticles, which when entrained in polymer coating materials, may block near infrared light at lower wavelengths as compared to particles produced by known batch conventional processes in the same given coating.

Those of skill in the art will recognize certain modifications, permutations, additions and sub-combinations thereof of the reagents and steps noted herein. While an exemplary method of continuously producing indium-tin-oxide nanoparticles and indium-tin-oxide nanoparticles having a substantially consistent indium to tin ratio is disclosed for what are presently considered the exemplary embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for preparing an indium-tin-oxide nanopowder having a substantially consistent indium-to-tin ratio, a desired particle size range and desired particle shape comprising:
  a) preparing a seeding solution including at least one indium salt, at least one tin salt, at least one solubility modifier, and at least one base in a solvent so as to form a substantially clear solution of intermediate indium compounds and tin compounds having a general formula expressed as $[M(OH)_xC_y]$, where M is an indium or tin ion, and C is the cationic part of the at least one indium salt or the least one tin salt, x is a number greater than 0 and y=[M valence−x]/C valence;
  b) adjusting the pH of the seeding solution and the concentration of the solubility modifier so as to solubilize the indium and tin intermediate compounds to near the onset of precipitation wherein the pH of the seeding solution is about 0 to about 3;
  c) continuously introducing into a reaction vessel the seeding solution having the indium and tin intermediate compounds therein;
  d) continuously introducing into the reaction vessel a base solution comprising one or more bases;
  e) continuously mixing in the reaction vessel the seeding solution and the base solution such that the indium and tin intermediate compounds react with the base solution to form a mixture including crystalline and amorphous precipitated indium-tin nanoparticles, the rate of the introduction of the seeding solution and the base solution to the reaction vessel each being independently adjustable so as to maintain the pH of the mixture in the reaction vessel at a substantially constant pH of greater than about 3 and a substantially constant ratio of indium intermediate compounds to tin intermediate compounds in the mixture;
  f) continuously collecting and removing from the reaction vessel a portion of the mixture having therein indium-tin precipitated nanoparticles;
  g) washing and drying the removed indium-tin precipitated nanoparticles; and
  h) heating the washed and dried indium-tin precipitated nanoparticles so as to obtain the indium-tin-oxide nanopowder.

2. The process according to claim 1, wherein the indium-tin-oxide is formed into a shape by molding or formed into a dispersion.

3. The process according to claim 2, wherein the dispersion is carried out in a dispersion solvent, the dispersion solvent being one of more of water; methanol; ethanol; n- and iso-propanol; butanol; glycols and glycol esters; ethylene glycol; propylene glycol; butylene glycol and the corresponding di-, tri-, tetra-, penta-, or hexamers and the corresponding mono- or diethers, where one or both hydroxyl groups are replaced a methoxy, ethoxy, a propoxy, a butoxy group; a ketone; acetone; butanone; an ester; ethyl acetate; an ether; diethyl ether; tetrahydrofuran; tetrahydropyran; an amide; dimethylacetamide; dimethylformamide; a sulphoxide; a sulphone; a sulpholane; dimethyl sulphoxide; an aliphatic hydrocarbon; pentane; hexane; cyclohexanone; a polyols; 2-methyl-2,4-pentanediol; polyethylene glycols and ethers thereof; diethylene glycol; diethylene glycol; tetraethylene glycol; diethylene glycol diethyl ether; tetraethylene glycol dimethyl ether; diethylene glycol mono butyl ether; ethylene glycol; diethylene glycol; diethylene glycol mono butyl ether; 3,6,9-trioxadecanoic acid; beta-alanine; polyoxyethylene(20); sorbitan monooleate; caprolactam; citric acid; glycolic acid or malic acid.

4. The process according to claim 2, wherein the dispersion is provided as a paste having, on a weight/weight basis, an indium-tin-oxide nanoparticle concentration of about 10% to about 80%.

5. The process according to claim 2, wherein the dispersion includes one more surfactants.

6. The process according to claim 5, wherein the one or more surfactant is selected from the group consisting of: a cationic surfactant; an anionic surfactant; a non-ionic surfactant; an amphoteric surfactant; a saturated or unsaturated polyethylene oxide derivatives; a (mono)carboxylic acid with the carboxylic acid having more than 7 carbon atoms, a (mono)carboxylic acid with the carboxylic acid having more than 11 carbon atoms; stearic acid; palmitic acid; oleic acid; sorbitan esters; polyethylene oxide (mono)alkyl ethers with alcohols having more than 7 carbon atoms; or polyethylene oxide (mono)alkyl ethers with alcohols having more than 11 carbon atoms, and mixtures thereof; the one or more surfactant being present in the dispersion, on a weight/weight basis, in a concentration range of about 2% to about 40% of the total mass of the dispersion.

7. The process according to claim 1, wherein the pH and temperature of the mixture in the reaction vessel are maintained at predetermined levels during the continuous precipitation of the crystalline and amorphous indium-tin nanoparticles.

8. The process according to claim 7, wherein the pH of the mixture in the reaction vessel is maintained about 9 to about 13, the temperature of the reactant mixture is maintained at about 20° C. to about 50° C. and the crystalline and amorphous precipitated indium-tin nanoparticles are collected at a pH of about 9 to about 13.

9. The process according to claim 8, wherein the pH of the mixture is maintained at about 12 and the temperature of the mixture is about 20° C. to about 24° C.

10. The process according to claim 8, wherein the indium-tin-oxide nanoparticles are substantially spherically-shaped and have particle size range about 8 nm to about 200 nm.

11. The process according to claim 8, wherein the indium-tin-oxide nanoparticles are substantially spherically-shaped and have particle size range of about 8 nm to about 70 nm.

12. The process according to claim 7, wherein the pH of the mixture is maintained at about 3 to about 6, the temperature of the mixture is maintained at about 40° C. to about 60° C. and the crystalline and amorphous precipitated indium-tin nanoparticles are collected at a pH of about 9 to about 10; the crystalline and amorphous precipitated indium-tin nanoparticles comprised of substantially plate-like-shaped nanoparticles having an average plate dimension of about 60 nm×200 nm.

13. The process according to claim 1, wherein the at least one solubility modifier is provided in a ratio of about 0.75 moles to about 2.0 moles per mole of tin.

14. The process according to claim 1, wherein the at least one base to tin is provided in a molar ratio of about 0.5 to about 3.0.

15. The process according to claim 1, wherein the seeding solution of a); the crystalline and amorphous precipitated indium-tin nanoparticles of e); and the indium-tin-oxide nanopowder of h) have substantially the same ratio of indium to tin at any given time point in the continuous reaction.

16. The process according to claim 15, wherein the ratio of the at least one indium salt to the at least one tin salt in the seeding solution is about 5% to about 15%.

17. The process according to claim 15, wherein the seeding solution has a ratio of indium to tin of about 90:10, the crystalline and amorphous precipitated indium-tin nanoparticles have a ratio of indium to tin of about 90:10 which remains substantially consistent from one nanoparticle to another nanoparticle throughout the process and the indium-tin-oxide nanopowder has a ratio of indium to tin of about 90:10.

18. The process according to claim 1, wherein: the at least one indium salt is selected from the group consisting of: indium (III) chloride, indium (I) chloride, indium (I) iodide, indium (III) iodide, indium (III) acetate, indium bromide, indium (III) nitrate, indium (III) sulfate, indium (III) alkoxides and mixtures thereof; and wherein the at least one tin salt is selected from the group consisting of: tin (II) chloride, tin (IV) chloride, tin (IV) sulfate, tin (II) sulfate, tin (IV) alkoxides, tin (II) alkoxides and mixtures thereof.

19. The process according to 1, wherein: the at least one solubility modifier is selected from the group consisting of: a carboxylic acid, hydroxy acid, amine, amide, do-decyl amine, decylamine, tartaric acid, citric acid, β-alanine, methyl amine, ethyl amine, n- and i-propyl amine, butyl amine, polyethylene amine, caprolactam, nonanolactam and mixtures thereof; and the at least one solubility modifier is present in a concentration of about 0.75 moles to about 2.0 moles per mole of tin.

20. The process according to claim 1, wherein: the at least one base and the base solution is selected from the group consisting of: sodium hydroxide, potassium hydroxide, ammonium hydroxide, tetramethylammonium hydroxide, ammonia, a primary aliphatic amine, a secondary aliphatic amine, a tertiary aliphatic amine, a primary aromatic amine, secondary aromatic amine, a tertiary aromatic amine and mixtures thereof.

21. The process according to claim 1, wherein the mixture including crystalline and amorphous precipitated indium-tin nanoparticles has a residence time in the reaction vessel of about 15 minutes to about 300 minutes.

22. An indium-tin-oxide nanopowder produced according to the process of claim 1, wherein at least 90% of the indium-tin precipitated nanoparticles and the indium-tin-oxide nanoparticle powder particles have the same ratio of indium to tin as in the seeding solution within a measurement error of +/−10 percent.

23. An indium-tin-oxide nanoparticle preparation according to the process of claim 1, which when entrained at a concentration of about 6%, on a weight/weight basis, in a given polymer coating material and applied to a glass substrate at a thickness of about 6 microns, blocks at least 90% of near infrared light at wavelengths of 1100 nm.

* * * * *

UNITED STATES PATENT AND TRADEMARK OFFICE
CERTIFICATE OF CORRECTION

| | | |
|---|---|---|
| PATENT NO. | : 9,296,622 B2 | Page 1 of 1 |
| APPLICATION NO. | : 13/671150 | |
| DATED | : March 29, 2016 | |
| INVENTOR(S) | : Mahabadi et al. | |

It is certified that error appears in the above-identified patent and that said Letters Patent is hereby corrected as shown below:

On the Title Page:
Item 72 under Inventors: Please delete "Guibun Ma" and insert --Guibin Ma--.

Signed and Sealed this
Seventh Day of June, 2016

Michelle K. Lee
*Director of the United States Patent and Trademark Office*